United States Patent [19]
Newman

[11] 3,744,608
[45] July 10, 1973

[54] CENTRIFUGALLY AND SPRING ENGAGED CLUTCH

[75] Inventor: Harry B. Newman, Washington, Ill.

[73] Assignee: Caterpillar Tractor Co., Peoria, Ill.

[22] Filed: Mar. 1, 1972

[21] Appl. No.: 230,854

[52] U.S. Cl............. 192/105 A, 192/3.57, 192/18 A, 192/52, 192/83, 192/86, 74/339
[51] Int. Cl.............................................. F16d 23/10
[58] Field of Search............... 192/83, 105 A, 85 F, 192/89, 3.57, 52, 13 R, 4 A, 70.21, 70.27; 74/339

[56] References Cited
UNITED STATES PATENTS

| | | | |
|---|---|---|---|
| 3,667,583 | 6/1972 | Richards | 192/105 A |
| 2,210,416 | 8/1940 | Kiep et al. | 192/105 A X |
| 2,072,117 | 3/1937 | Lewis | 192/52 X |
| 2,555,860 | 6/1951 | Reed | 192/109 A X |
| 840,626 | 1/1907 | Huff | 192/70.21 |
| 2,587,141 | 2/1952 | Grandgirard | 192/109 A X |
| 2,551,918 | 5/1951 | Wickwire | 192/105 A |

Primary Examiner—Benjamin W. Wyche
Attorney—Donald J. McRae et al.

[57] ABSTRACT

A self modulating clutch transmits drive from an engine to a transmission of the form having ratio gears which are momentarily braked to a stationary condition to facilitate shifting. Springs exert a light pressure on the clutch plates prior to re-engagement at the conclusion of a shift whereby the gears are briefly rotated by a relatively low torque prior to the re-application of full engine torque by re-engagement of the clutch. This rollover of the ratio gears assures that the selected gear engagements take place reliably and without severe wear or damage.

5 Claims, 3 Drawing Figures

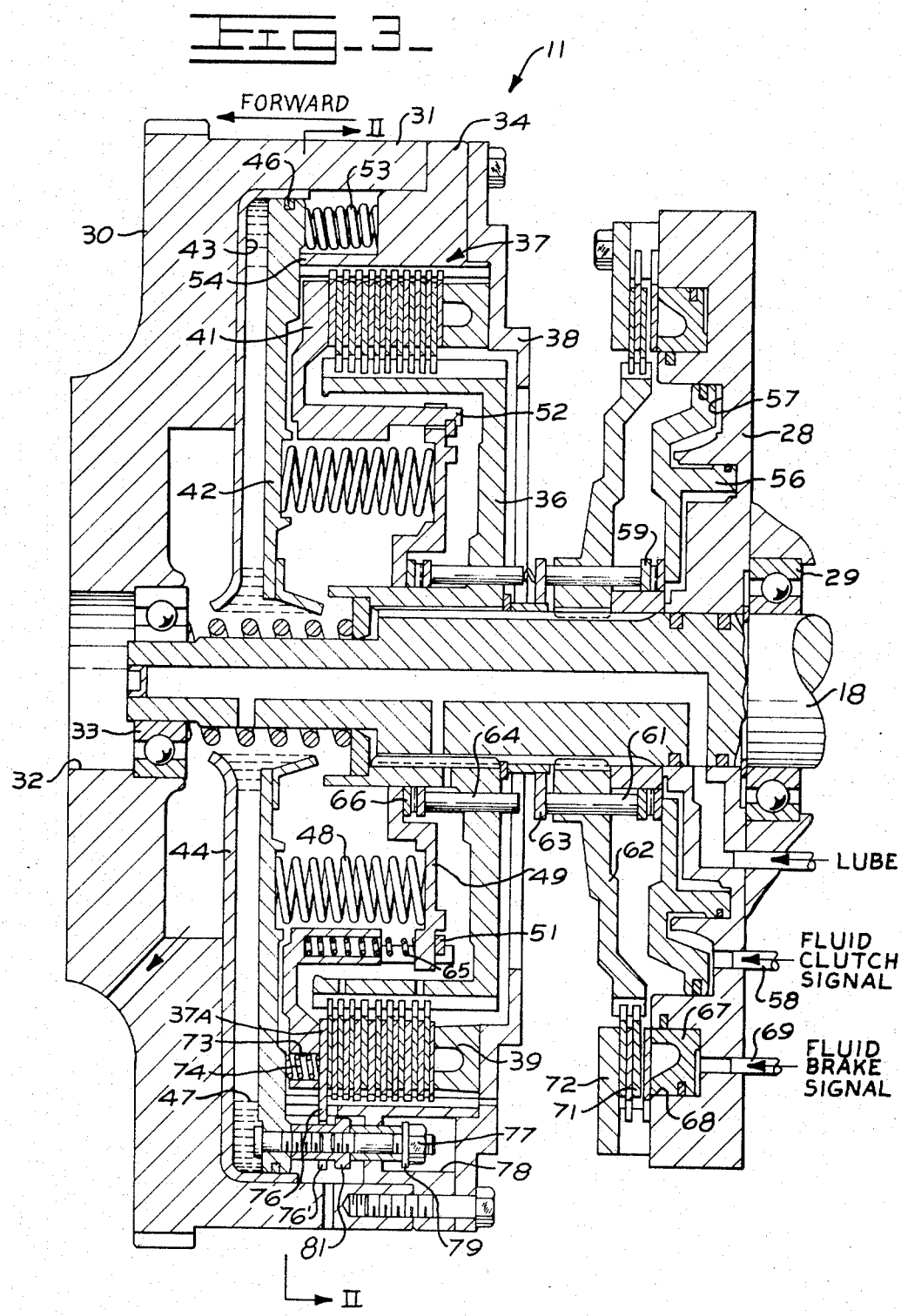

CENTRIFUGALLY AND SPRING ENGAGED CLUTCH

BACKGROUND OF THE INVENTION

This invention relates to clutches for disposition between a driving engine and a multispeed ratio gear box transmission and more particularly to a clutch having simplified and reliable means for rolling over the transmission gears to assure that engagements take place prior to the application of full engine torque thereto.

Prior U.S. Pat. No. 3,508,450 discloses a form of transmission for vehicles and the like which combines certain advantages of automatic and manually shifted standard transmissions. Among other characteristics distinct from more conventional practice, the transmission of U.S. Pat. No. 3,508,450 employs ratio gears which are decoupled from the driven load as well as the driving engine in preparation for changing speed ratios. The isolated ratio gears are then momentarily braked to a stop to facilitate the desired change of gear engagements after which the gears are re-accelerated and re-coupled to the driving engine and driven load. Since shifting is accomplished with the gears in a stationary or near stationary condition, conventional synchronizing means are not needed and the gear box may therefore be simpler, more compact and may provide a greater number of drive ratios without impractical structural complication.

In the form of transmission discussed above, the fact that the gears are brought to a stop prior to shifting creates the possibility that tooth abutments may occur as shifting is attempted if two sets of gear teeth to be engaged happen to come to rest in a state of alignment or partial alignment. Where this occurs, the desired gear engagement will not take place at the preferred stage in the shift transient. Instead, the engagement will be completed only after torque is again applied to the gear box whereby relative rotation between the abutted gear teeth occurs. As the application of engine torque to the abutted gears by re-engagement of the input clutch is very rapid and forceful, severe wear or damage could occur in the absense of corrective measures.

To avoid this problem, prior U.S. Pat. No. 3,508,450 teaches the use of a friction drive which is essentially connected in parallel with the input clutch. When the input clutch is disengaged and the ratio gears are forcably stopped by brake means, the friction drive slips and does not transmit torque to the ratio gears. The brake means are released slightly prior to re-engagement of the input clutch and during the brief intervening interval, the friction drive transmits a relatively small torque to the ratio gears to provide a gentle rollover motion which turns any abutted gear teeth out of alignment enabling the desired engagement to be completed prior to the application of full engine torque to the gear box. Thus severe wear and the risk of tooth damage is avoided.

In practice, the friction drive rollover means described above tends to be undesirably variable with respect to the timing, speed and force of the rollover motion. This variability results from several factors such as the sensitivity of a friction drive to slight dimensional changes from wear and temperature variations and a similar sensitivity to differences in the viscosity of the surrounding lubricating medium either from temperature changes or use of different lubricants. In order to fully minimize gear tooth wear, it is preferably to employ other rollover means for the same purpose in which the rollover motion is more precisely timed and controlled.

Co-pending application Ser. No. 217,784 of Charles H. Herr, filed Jan. 14, 1972 for TRANSMISSION INPUT CLUTCH and assigned to the Assignee of the present application discloses an improved rollover mechanism wherein epicyclic or planetary gear means are connected in parallel with the input clutch plates to transmit a precisely predetermined proportion of engine torque to the ratio gears during the final period of the shift transient. However the advantages of precision and consistency in the amount, speed and timing of rollover motion are gained at the expense of significant structural complication of the input clutch. Where compactness and economy are important factors, it may be preferable to utilize a less complex mechanism for providing the rollover function.

SUMMARY OF THE INVENTION

This invention is an input clutch for a transmission of the general type discussed above having a very simple, economical, compact and reliable means for rolling over the ratio gears prior to re-application of full engine torque to the gears to assure that desired gear engagements are fully effected without severe wear or damage. For this purpose spring means are provided to exert a relatively light pressure on the input clutch plates prior to the application of pressure from the clutch pressure plate which re-engages the clutch. Thus when the brake means is released near the conclusion of a shift, a small amount of torque is transmitted through the input clutch plates to effect the desired rollover motion prior to the time that the primary engagement pressure is applied to the clutch plates to transmit full engine torque therethrough.

Accordingly, it is an object of this invention to provide a simple compact and economical means for minimizing wear and the risk of gear tooth damage in a transmission of the form in which ratio gears are braked to facilitate shifting.

The invention, together with further objects and advantages thereof, will best be understood by reference to the following description of a preferred embodiment taken in conjunction with the accompanying drawings.

BRIEF DESCRIPTION OF THE DRAWINGS

In the drawings:

FIG. 3 is an axial section view of the input clutch taken along angled line III—III of FIG. 2.

DESCRIPTION OF A PREFERRED EMBODIMENT

Figure 1:
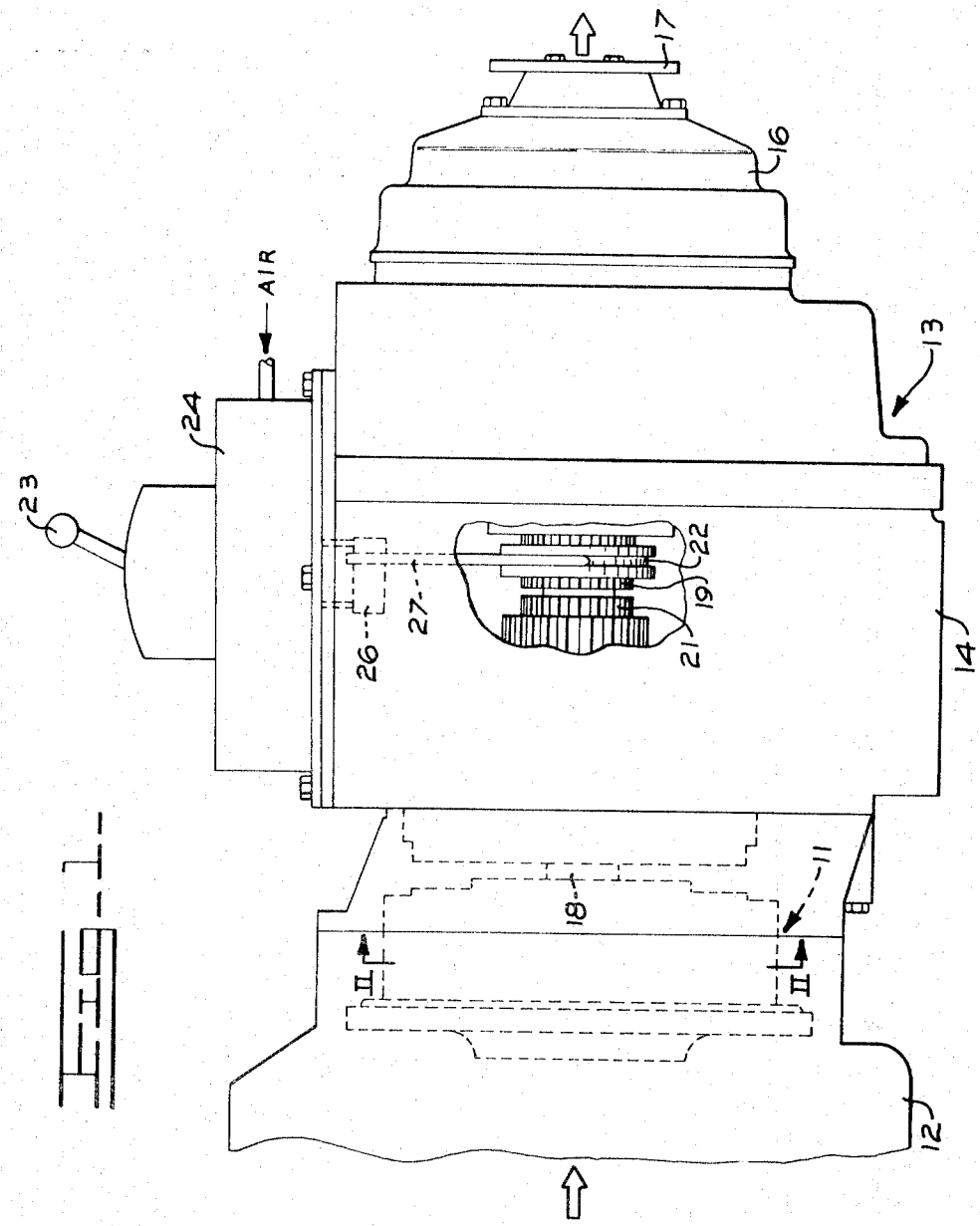
FIG. 1 is a side elevation view of a multi-speed transmission for vehicle including a portion of the associated driving engine and having a clutch for transmitting drive between the engine and the transmission in accordance with the present invention, a portion of the transmission side wall being broken out to illustrate typical ratio gears and shift means therein.

Referring now to FIG. 1 of the drawing, a self modulating clutch 11 embodying the present invention is shown coupling a vehicle engine 12 and a multi-speed ratio transmission 13. Transmission 13 is of the general type disclosed in U.S. Pat. No. 3,508,450 which should be referred to for a description of one suitable detailed construction for the transmission. Such a transmission 13 has a change speed gear box section 14 and an output clutch 16 with a flange 17 for connection to the drive line of a vehicle or other driven load. Gear box section 14 includes a plurality of ratio gears which may be selectively interconnected in a plurality of ways to provide a plurality of speed ratios between the transmission input shaft 18 and output flange 17, only two such ratio gears 19 and 21 being shown in FIG. 1. A toothed clutch collar 22 is carried on gear 19 in splined engagement therewith and when a particular selected speed ratio calls for engagement of gears 19 and 21, clutch collar 22 is shifted axially to engage with both gears and transmit drive therebetween. Movement of the clutch collars 22 in response to manual movement of an operator's control lever 23 between speed settings is preferably realized by means of a pneumatic control circuit 24 of the form described in detail in U.S. Pat. No. 3,570,636 which circuit energizes pneumatic cylinders 26 to manipulate the shift forks 27 that engage clutch collars 22.

The function of the input clutch 11 and the output clutch 16 in connection with a change of speed ratios is to decouple the ratio gears 19 and 21 from both the engine 12 and the driven load and to momentarily stop such gears so that clutch collars 22 may be shifted without requiring synchronizers or other complex equivalent mechanisms within the gear box. The clutch 11 should then briefly rotate input shaft 18 with a low torque input to assure that any abutment of teeth of a clutch collar 22 with a gear 21 to be engaged is removed and the desired engagement is completed. Thereafter, input and output clutches 11 and 16 reengage to resume torque transmission to flange 17 at the changed speed ratio.

Figure 2:
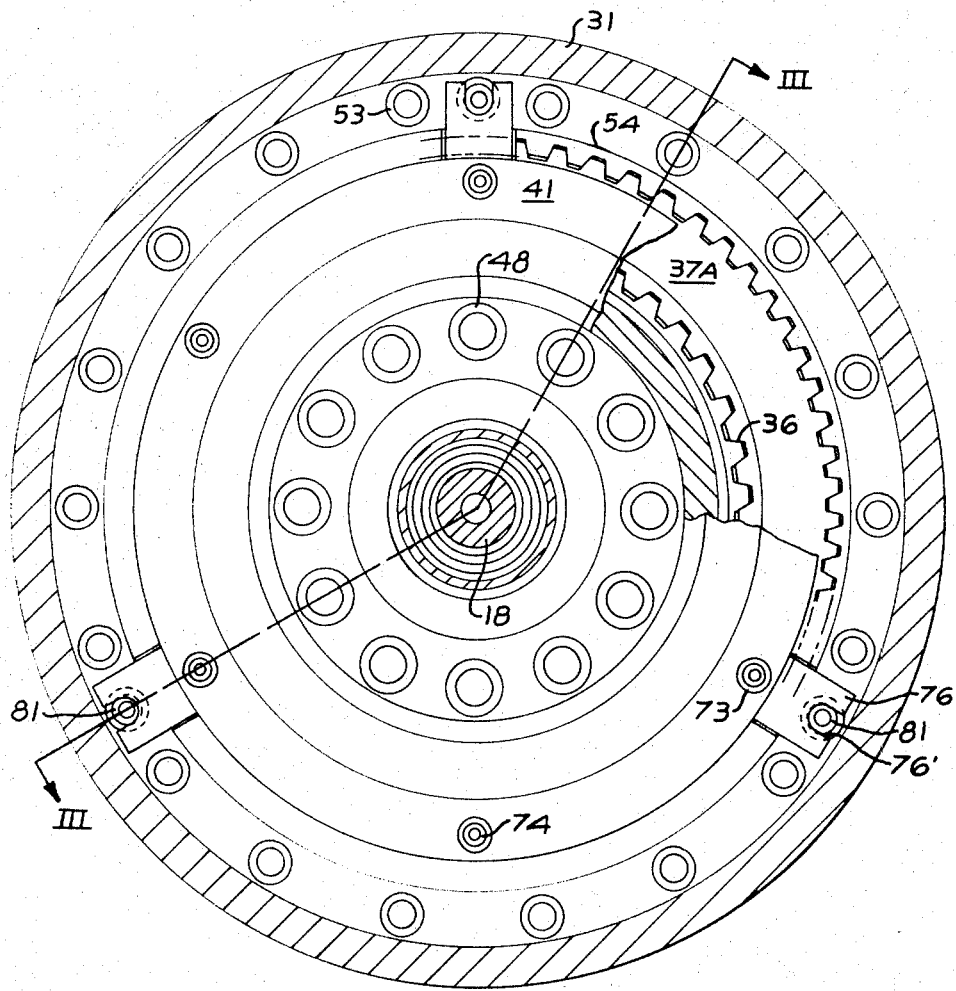
FIG. 2 is a cross section view of the input clutch of FIG. 1 taken along the line II—II thereof.

Considering now the structure of input clutch 11 in more detail, reference should be made to FIGS. 2 and 3 in conjunction. Aside from the novel rollover mechanism to be hereinafter described, input clutch 11 is essentially of the self modulating form described and claimed in co-pending application Ser. No. 30,680 of Elmer A. Richards for SELF-MODULATED INPUT CLUTCH FOR VEHICLE DRIVE TRANSMISSIONS, filed Apr. 22, 1970, and now U.S. Pat. No. 3,667,583 assigned to the Assignee of the present application. Such an input clutch 11 may be constructed as an essentially unitary mechanism with the associated transmission and in this arrangement the main shaft or output shaft of the clutch 11 may simply be a forward extension of the transmission input shaft 18 which extends through a front wall 28 of the transmission gear box section and is journalled therein by suitable bearing means 29. The drive input member of the clutch 11 may be the engine flywheel 30 which for purposes hereinafter described is formed with an integral sleeve portion 31 around the outer edge which extends toward transmission front wall 28. The forward end of the main shaft 18 extends a short distance into a bore 32 in flywheel 30 and is juornalled therein by a suitable bearing 33. Annular input member 34 is secured to flywheel sleeve portion 31 for rotation therewith and an annular driven hub 36 is disposed coaxially therewith and radially spaced therefrom and is splined to main shaft 18 for rotation therewith. To transmit drive from flywheel 30 to main shaft 18 when the clutch is engaged, a plurality of annular flat clutch plates 37 are disposed between input member 34 and driven hub 36 with alternate ones of the plates being splined to the input member and the intervening plates being splined to the driven hub. An annulus 38 is secured to input member 34 and extends radially inward therefrom behind the clutch plates 37 and supports an annular seat 39 against which the clutch plates may be compressed to engage the clutch. An annular pressure plate 41 is situated immediately forward from the clutch plates and is movable in an axial direction to apply pressure to the plates to engage the clutch and to relieve such pressure and thereby disengage the clutch.

In more conventional clutches, such movement of the pressure plate is controlled manually by the operator through a clutch pedal and associated linkage. In a clutch 11 of the present form, the clutch automatically disengages at low engine speeds and undergoes an automatic self-modulated re-engagement as engine speed increases. Regardless of engine speed, the clutch disengages at the start of a shift transient in response to a fluid pressure signal from the previously described control system and subsequently undergoes a self-regulated re-engagement in response to termination of such signal at the conclusion of the shift transient.

Structure for realizing these functions includes an axially movable clutch capacity modifying plate 42 disposed within the chamber 43 defined by flywheel sleeve portion 31. Such chamber 43 has an annular liner 44 at the forward end and a seal 46 mounted in the rim of capacity modifying plate 42 bears against the liner whereby when the flywheel and modifying plate are rotated by the driving engine a volume of lubricating oil 47 is trapped by centrifugal force between the liner and modifying plate and exerts a rearward force against the modifying plate which force is a function of engine speed. To cause engagement of clutch 11 in response to rearward movement of modifying plate 42, a plurality of engagement springs 48 are disposed between the modifying plate and an annular element 49 slidable along driven hub 36. Annular element 49 bears against a ring 51 mounted in fingers 52 that extend rearwardly from pressure plate 41. Accordingly rearward movement of modifying plate 42 in response to an increase of pressure in oil volume 47 acts to transmit a force to the pressure plate 41 tending to engage the clutch 11.

Such rearward movement of modifying plate 42 is resisted by a plurality of disengagement springs 53 disposed between the modifying plate and input member 34. At low engine speeds, disengagement springs 53 are able to hold the modifying plate 42 in the forward position and at this position engagement springs 48 do not transmit any significant force to pressure plate 41. Accordingly, clutch 11 is disengaged. As engine speed increases above the idling range the pressure of the rotating oil volume 47 against the modifying plate 42 increases and plate 42 therefore begins to shift rearwardly causing engagement springs 48 to transmit an increasing stronger force to pressure plate 41 and thereby effect a modulated engagement of the clutch 11 wherein the clutch capacity gradually increases as a function of engine speed to simulate the actions of a human operator in releasing a clutch pedal. At an intermediate engine speed, modulation is no longer desirable and clutch capacity should remain substantially constant as engine speed increases to the maximum. For this purpose, a stop 54 extends forward from input member 34 in position to block further rearward movement of modifying plate 42 at the appropriate engine speed. Once plate 42 contacts stop 54, the clutch capacity remains substantially constant as engine speed increases further and is fixed by the force of the engagement springs 48, such force being sufficient to maintain the clutch in the engaged condition at rated loads.

In order to force disengagement of the clutch 11, regardless of engine speed, for the purpose of making a shift of the associated transmission, the pressure plate 41 must be forced forwardly. For this purpose a disengagement piston 56 is disposed in an annular cavity 57 in the forward face of transmission front wall 28. A conduit 58 connects with cavity 57 to receive a fluid pressure signal from the previously described pneumatic control circuit at the beginning of a shift transient and such fluid pressure causes piston 56 to advance within cavity 57. The forward motion of piston 56 is transferred to annular element 49 through a needle bearing 59. Bearing 59 bears against a series of axially movable pins 61 which are transpierced through a brake hub 62 splined to main shaft 18 and which in turn bear against a ring 63 slidable along the main shaft. Ring 63, upon sufficient forward motion, contacts an additional series of pins 64 transpierced through driven hub 36 with the forward motion of pins 64 being transmitted to annular element 49 through an additional needle bearing 66. Thus the above described forward motion of the piston 56 acts to relieve the pressure of engagement springs 48 against the clutch pressure plate 41 and thereby disengages the clutch 11 without regard to engine speed. Springs 65, extending between pressure plate 41 and annular element 49, assure that the pressure plate moves forward relative to the clutch plates at this time. Depending on engine speed, modifying plate 42 may not necessarily move forward. At the conclusion of shift transient, the pneumatic control circuit relieves the pressure behind piston 56 enabling the clutch 11 to re-engage.

As previously discussed, shifting of the transmission with which the present invention is associated requires braking of the main shaft 18 of the clutch during initial portion of shift transient in order to stop rotation of the ratio gears. For this purpose, an annular brake piston 67 is situated in an additional annular cavity 68 in wall 28. Brake piston 67 is shifted forward as the clutch 11 disengages by fluid pressure received through a conduit 69 which communicates with cavity 68. Forward motion of brake piston 67 compresses a series of brake discs 71 against a member 72 secured to wall 28. Alternate ones of the brake discs 71 are splined to member 72 while the intervening ones of the brake discs are splined to brake hub 62. Thus the above described advancement of brake piston 67 acts to brake the main shaft 18 and therefore stops motion of the ratio gears of the associated transmission. Release of the fluid pressure from cavity 68 near the conclusion of the shift transient enables the main shaft 18 to be reaccelerated as will hereinafter be described.

As hereinbefore discussed, it is desirable taht the main shaft 18 momentarily be rolled over relatively gently in the interval between release of brake hub 62 and re-engagement of the clutch 11 in order to assure that any tooth abutments in the ratio gears are eliminated and necessary gear engagements are completed. Considering now the means through which such rollover motion is provided for in the present invention, the clutch pressure plate 41 has a series of bores 73 extending therethrough at equiangular intervals around the axis of the pressure plate and one of a series of compression springs 74 is disposed in each such bore. The forward end of each rollover spring 74 bears against capacity modifying plate 42 while the back end of each such spring bears against the adjacent clutch plate 37A. Thus the rollover springs 74 continue to apply pressure to the clutch plates during the above described shift transient period in which the pressure of engagement springs 48 has been removed from the clutch plates by energization of piston 56, provided that engine speed has not dropped sufficiently that modifying plate 42 has shifted forwardly. This does not result in the transmission of torque through the clutch plates 37 during the initial portion of the shift transient as the pressure of rollover springs 74 on the clutch plates is insufficient to cause rotation of the main shaft 18 while brake piston 67 remains actuated. Following release of fluid pressure from behind brake piston 67 near the conclusion of the shift transient period, the light pressure from the rollover springs 74 applied to clutch plates 37 produces a low torque rotation of main shaft 18 whereby completion of the desired gear engagements is assured. After this brief rollover period in which gear engagements are assured, fluid pressure is exhausted from behind piston 56 to allow engagement springs 48 to again apply pressure to the clutch through pressure plate 41 and thereby reestablish full torque transmission through the clutch.

It is preferable from the standpoint of reducing the wear that the rollover spring force be completely removed from the clutch plate assembly during the periods that engine speed is at low idle and modifying plate 42 is fully forward. Accordingly, the most forward clutch plate 37A has radial extensions 76 each having a slot 76' at the outer end. Stop assemblies 77 extend rearwardly from capacity modifying plate 42 and each such assembly passes through a slot 76' of one of the clutch plate extensions and into a chamber 78 in input member 34. One function of stop assemblies 77 is to fix the forward limit of movement of modifying plate 42 and for this purpose a flange 79 is provided on each such extension to contact the forward wall of chamber 78 when the modifying plate 42 is at the forward position. Stop assemblies 77 also have additional flanges 81 positioned to contact extensions 76 and force clutch plate 37A forward relative to the other clutch plates as modifying plate 42 approaches the most forward position at which the clutch is fully disengaged. Thus at the idle speed disengaged condition of the clutch, rollover springs 74 are compressed between modifying plate 42 and front clutch plate 37A and exert no pressure on the clutch plate assembly as a whole. However, when modifying plate 42 moves rearwardly as engine speed increases, front clutch plate 37A reseats against the other clutch plates prior to the time that pressure plate 41 contacts the clutch plate assembly to re-engage the clutch.

While the invention has been described with respect to a single preferred embodiment it will be apparent that many modifications are possible and it is not intended to limit the invention except as defined in the following claims.

What is claimed is:

1. A clutch for transmitting rotary drive from an engine to a transmission in which ratio gears are decoupled from said engine and braked to facilitate shifting, comprising rotary input means coupled to said engine and driven thereby, said rotary output means coupled to said ratio gears of sadi transmission, a plurality of clutch plates at least one of said clutch plates being coupled to said input means for rotation therewith and at least one of said clutch plates being coupled to said output means for rotation therewith, a pressure plate movable relative to said clutch plates, wherein said pressure plate has a plurality of angularly spaced bores therein means for shifting said pressure plate to apply engagement pressure to said clutch plates to engage said clutch for transmitting torque from said input means to said output means thereof, means for shifting said pressure plate to relieve said engagement pressure on said clutch plates to disengage said clutch, and rollover means for applying a relatively light pressure to said clutch plates prior to application of said engagement pressure thereto by said pressure plate wherein said rollover means comprises a plurality of compression springs each extending in one of said bores of said pressure plate and bearing against the adjacent one of said clutch plates.

2. A clutch for transmitting rotary drive from an engine to a transmission in which ratio gears are decoupled from said engine and braked to facilitate shifting, comprising rotary input means coupled to said engine and driven thereby, rotary output means coupled to said ratio gears of said transmission, a plurality of clutch plates at least one of said clutch plates being coupled to said input means for rotation therewith and at least one of said clutch plates being coupled to said output means for rotation therewith, a pressure plate movable relative to said clutch plates, means for shifting said pressure plate to apply engagement pressure to said clutch plates to engage said clutch for transmitting torque from said input means to said output means thereof, means for shifting said pressure plate to relieve said engagement pressure on said clutch plates to disengage said clutch, and rollover means for applying a relatively light pressure to said clutch plates prior to application of said engagement pressure thereto by said pressure plate, wherein said clutch plates and said pressure plates are annular and disposed for rotation about a single axis and wherein said means for shifting said pressure plate to apply engagement pressure to said clutch plates comprises an annular movable clutch capacity modifying member disposed for rotation about said axis, means for moving said modifying member relative to said pressure plate in response to changes of speed of said input means, and engagement spring means acting between said modifying member and said pressure plate for causing said pressure plate to exert said engagement pressure on said clutch plate as said modifying member moves in response to a predetermined increase of speed of said input means, and wherein said rollover means comprises additional spring means acting directly between said capacity modifying member and said clutch plates independently of said engagement spring means.

3. A clutch as defined in claim 2 further comprising means for relieving said relatively light pressure of said rollover means on said clutch plates when the speed of said rotary input means is below a predetermined value.

4. A clutch as defined in claim 2 wherein said additional spring means acts between said capacity modifying member and the most adjacent one of said clutch plates and further comprising stop means movable with said capacity modifying member for separating said most adjacent clutch plate from the others of said clutch plates after said modifying member has moved in response to a decrease of speed of said input means to relieve said engagement pressure of said pressure plate on said clutch plates.

5. A clutch for interconnecting an engine and a transmission of the form having ratio gears which are decoupled from said engine and braked to facilitate shifting, comprising:

a rotatable input member having means defining an annular chamber in which fluid is trapped by centrifugal force upon rotation of said input member, a rotatable output member disposed coaxially with respect to said input member and coupled to said ratio gears of said transmission, a plurality of clutch plates disposed between said input member and output member in coaxial relation therewith, a first plurality of said clutch plates being coupled to said input member and a second plurality of said clutch plates being coupled to said output member, an annular pressure plate disposed coaxially with respect to said input and output members adjacent said clutch plates and being movable axially to exert engagement pressure against said clutch plates, an annular capacity modifying member disposed in said chamber of said input member and being movable in an axial direction relative thereto, said capacity modifying member being exposed to said centrifugal pressure of said fluid in said chamber and being movable in response thereto, disengagement spring means acting on said capacity modifying member in opposition to said force of said centrifugal pressure thereon, engagement spring means acting between said capacity modifying member and said pressure plate for transmitting said centrifugal pressure thereon to said pressure plate to engage said clutch, fluid operated piston means for forcibly relieving the pressure of said pressure plate on said clutch plates to disengage said clutch in preparation for shifting said ratio gears of said transmission, fluid pressure operated brake piston means for temporarily stopping rotation of said output member following said disengagement of said clutch, and a plurality of rollover spring means disposed for exerting a relatively small pressure on said clutch plates during the period that said engagement pressure of said engagement spring and said pressure plate thereon is relieved by said fluid operated piston means whereby a relatively small torque is briefly transmitted to said output member following release of said brake means.

* * * * *